(12) United States Patent
Schalk

(10) Patent No.: US 7,666,072 B2
(45) Date of Patent: Feb. 23, 2010

(54) DEVICE FOR TIGHTENING A TUBULAR CASING FILLED WITH A STUFFED PRODUCT

(75) Inventor: Gustav Albrecht Schalk, Oststeinbek (DE)

(73) Assignee: TIPPER TIE Technopack GmbH, Glinde (DE)

( * ) Notice: Subject to any disclaimer, the term of this patent is extended or adjusted under 35 U.S.C. 154(b) by 0 days.

(21) Appl. No.: 11/913,669

(22) PCT Filed: May 4, 2006

(86) PCT No.: PCT/EP2006/004187

§ 371 (c)(1),
(2), (4) Date: Aug. 6, 2008

(87) PCT Pub. No.: WO2006/117222

PCT Pub. Date: Nov. 9, 2006

(65) Prior Publication Data
US 2008/0307758 A1    Dec. 18, 2008

(30) Foreign Application Priority Data
May 4, 2005    (DE) ................... 20 2005 007 176 U

(51) Int. Cl.
*A22C 11/00*    (2006.01)
(52) U.S. Cl. ......................................................... 452/48
(58) Field of Classification Search ............. 452/21–26, 452/30–32, 35–39, 46–48, 51
See application file for complete search history.

(56) References Cited

U.S. PATENT DOCUMENTS

| 3,042,963 A | * | 7/1962 | Runge .......................... 452/48 |
| 3,587,240 A | | 6/1971 | George |
| 3,919,739 A | * | 11/1975 | Kawai ........................... 452/31 |
| 7,479,057 B2 | * | 1/2009 | Waldstaedt et al. ........... 452/32 |

FOREIGN PATENT DOCUMENTS

| DE | 1027548 B | 4/1958 |
| DE | 3610010 A1 | 10/1987 |
| DE | 3610010 C2 | 10/1987 |
| DE | 19934154 C1 | 10/2000 |

OTHER PUBLICATIONS

Sakamoto Hideo "Bagging Apparatus Employing Continuous Tubel-like Bag Body" Patent Abstracts of Japan, vol. 2000, No. 1 JP 11 292007 A (1999).

* cited by examiner

*Primary Examiner*—Thomas Price
(74) *Attorney, Agent, or Firm*—Casimir Jones, S.C.

(57) ABSTRACT

The invention relates to a device for tightening a tubular casing filled with a product by means of several pairs of displacers, wherein the mutually overlapping displacers of each pair encompass an opening, both displacers adjoining to the encompassed opening in two overlapping points per pair. The displacers are configured for a linear tightening movement depending on the varying size of the openings, the openings being located one behind the other in the axial direction of the tubular casing encompassing a passage. The openings are not congruent with the passage, the overlapping points being at a distance from the passage during the predominant part of the tightening movement. The invention allows the subdivision of the filled tubular casing into packaging units, thereby preventing or reducing the risk of damages to the tubular casing.

14 Claims, 2 Drawing Sheets

A

B

C

DEVICE FOR TIGHTENING A TUBULAR CASING FILLED WITH A STUFFED PRODUCT

Figure 1:
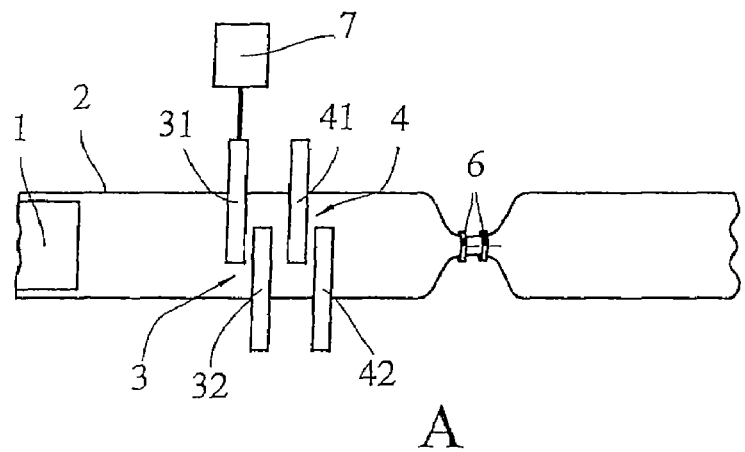
Figure 1:
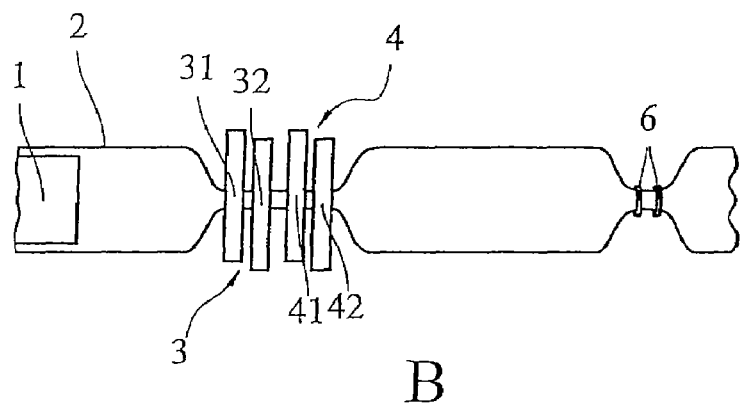
Figure 1:
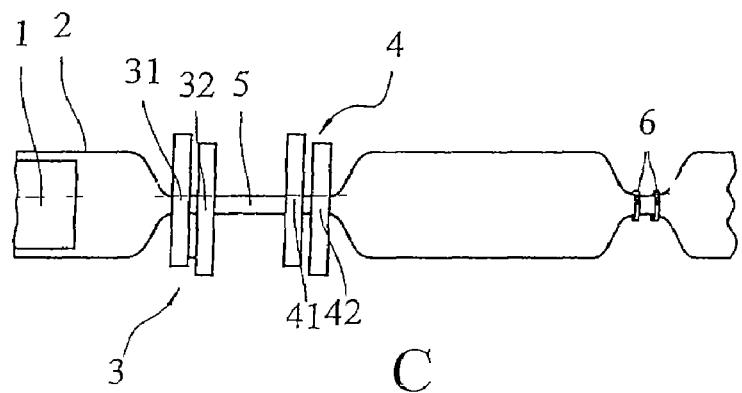

The invention relates to a device for constricting a tube filled with a filling, which device comprises several pairs of displacement members. In each pair, the displacement members are arranged such that they mutually overlap and enclose an opening. Both displacement members are contiguous to the enclosed opening at two overlap points per pair. The displacement members are movable relative to one another in the sense that they can execute a linear constriction movement, by means of which the size of the opening is altered. The openings lying one behind the other in the axial direction of the tube together enclose a passage.

Devices of this kind are used especially in sausage production, where filler machines fill a packaging tube with a filling. To divide the filled tube into packaging units, the pairs of displacement members enclose the filled tube with their openings. By means of a constriction movement of the displacement members, the openings are decreased in size and the tube is constricted. In the area of the displacement members, the filling is pressed out of the tube so that two separate packaging units are obtained whose fillings are completely separate from one another. The constricted tube can be gripped with a closure clip that fixes the constriction.

A problem in the known devices is that the tube can be damaged by the displacement members during the constriction movement, because the displacement members act at the overlap points in the manner of two scissor blades.

The object of the invention is to make available a device which avoids or reduces the danger of the tube being damaged.

The object is achieved by the features of Claim 1. Advantageous embodiments are set forth in the dependent claims.

A displacement member can in this case be any means that has sufficient strength to press filling out of a tube. The invention places no limitations on the shape of the displacement members or on the material from which they are made.

With the constriction movement, the tube enclosed by the opening is constricted. The displacement members move linearly towards one another, so that the opening decreases in size. At the same time as the opening decreases in size, the cross section of the tube becomes smaller and the filling located in the constricted area is displaced into adjacent portions of the tube. The constriction movement begins as soon as the displacement members engage the outer circumference of the tube. The greater part of the constriction movement signifies that part of the movement of the displacement members in which they have covered over 50% of the travel or pivot range for the total constriction movement.

During the constriction, the displacement members move linearly, the two displacement members of one pair preferably having a common axis of movement. This is advantageous because the centre of gravity of the two displacement members of one pair remains constant throughout the entire constriction movement. By virtue of the constant centre of gravity, vibrations remain minimal and, during the constriction movement, the displacement members transmit only slight forces to the surrounding machine parts. The outlay in terms of components is reduced.

The displacement members are described as overlapping when two displacement members cover each other in such a way that, viewed in the axial direction, they enclose a closed opening between them. The axial direction is the direction in which the tube that is to be constricted is oriented. It is unimportant whether the displacement members of one pair can be moved away from one another to an extent that they no longer completely enclose the opening. The only critical factor is that the opening is completely enclosed during the constriction movement.

The overlap points are the points at the edge of an opening where two displacement members, which form the opening, are contiguous to one another when viewed in the axial direction. Since the displacement members are able to move, the overlap points are not spatially fixed positions. Instead, the overlap points shift when the displacement members that form the overlap point move relative to one another.

The openings of the individual pairs lie behind one another in the axial direction, such that they at least partially cover one another. The intersection of all these openings in the axial direction, i.e. the area still left free of the openings, is referred to as the passage.

According to the invention, the openings are not congruent with the passage, and the overlap points are spaced apart from the passage during the greater part of the constriction movement. The openings are therefore offset relative to one another in such a way that one displacement member of one pair keeps an overlap point of the other pair at a distance from the passage. In this way, the overlap points of all the pairs can be spaced apart from the passage.

The distance between the overlap points and the passage is present at least during the greater part of the movement executed by the displacement members during constriction of the tube. It may be expedient, in one pair, to stop the constriction movement shortly before the end, so that it remains possible to move this pair along the constricted tube. In this case, it can happen that, in other pairs of displacement members, the distance between the overlap points and the passage disappears.

The inventive arrangement of the displacement members means that the tube is held at a distance from the overlap points during the greater part of the constriction movement. Since all the pairs of displacement members act on the tube simultaneously, the tube is constricted at the surface corresponding to the intersection of all the openings, that is to say the passage. Since the overlap points are at a distance from the passage, they are likewise at a distance from the constricted tube. Damage to the tube by its being pinched at the overlap points is avoided, since the particularly critical overlap points, where the danger of the tube being squeezed on account of the movement of the displacement members is particularly great, no longer come into contact with the tube. At the end of the constriction movement, contact between the tube and the overlap points can be accepted because the danger of damage is low when the tube is almost completely constricted.

In an advantageous embodiment, the overlap points are spaced apart from the passage during the whole constriction movement. The danger of the tube being damaged is further reduced.

In the simplest embodiment of the invention, two pairs of displacement members are required so that all the overlap points can be held at a distance from the passage. The displacement members of the first pair hold the overlap points of the second pair at a distance, and vice versa.

The pairs of displacement members succeed one another, preferably directly, in the axial direction. With a greater spacing in the axial direction, the tube, on account of its elasticity and despite the distance between the passage and the overlap points, could come into contact with the overlap points. The danger of the tube being damaged would increase.

In an advantageous embodiment, the pairs of displacement members are movable relative to one another in the axial direction. For the constriction, the pairs are positioned such that they directly succeed one another in the axial direction. When the tube is completely constricted, the pairs can be moved a distance away from one another in order to create a tube area that is free of filling. In the area free of filling, clips can be applied for final closure of the packaging units.

To ensure that the opening can be completely enclosed by two displacement members, the displacement members are concavely shaped on their face directed towards the opening. Concave shape signifies any shape that can be supplemented by a straight adjoining element to form a completely enclosed opening.

The concave shape of the face directed towards the opening can be a V shape. The limbs of the V preferably enclose an angle of between 80° and 100°, preferably of between 85° and 95°. At an angle of this size, the enclosed opening has a regular shape.

The desired distance, according to the invention, between the overlap points and the passage can easily be achieved by the fact that the pairs are offset at an angle relative to one another in a plane perpendicular to the axial direction. Mutual covering of the overlap points is advantageously achieved by the fact that the pairs are offset relative to one another at an angle of between 40° and 50°, preferably between 44° and 46°.

In an advantageous embodiment, the device comprises a drive element for the movement of the displacement members. Electric or hydraulic drive elements are possible in particular. The drive element can comprise in particular a spindle drive, an eccentric drive or a gear drive.

Each displacement member can be provided with its own drive element; it is also possible, however, for one drive element to drive several displacement members.

Figure 2:
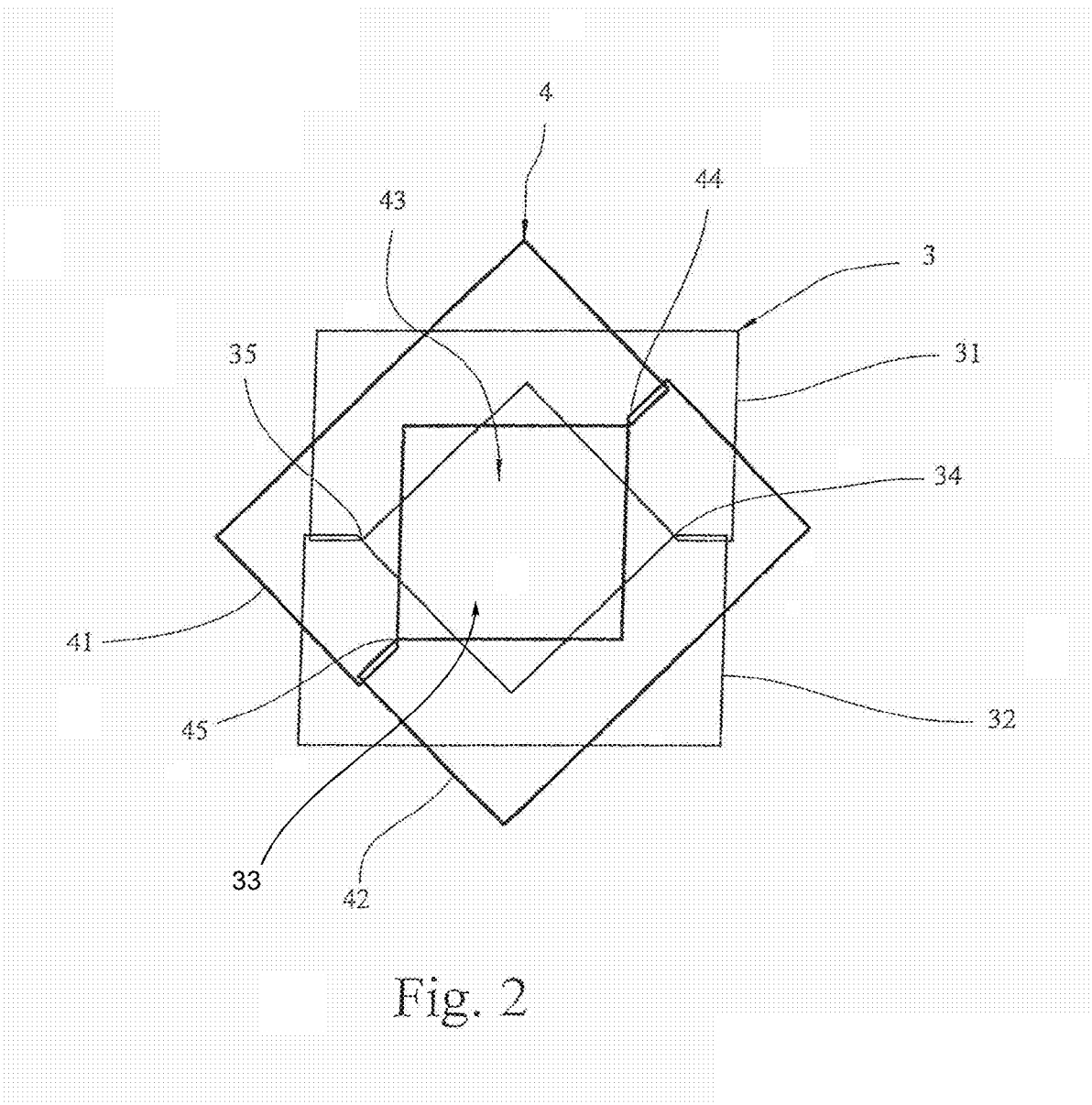

The invention is described below on the basis of an advantageous illustrative embodiment and with reference to the attached drawings, in which:

FIG. 1 shows a schematic representation of the mode of operation of the device according to the invention; and FIG. 2 shows a schematic view of the displacement members of the device according to the invention.

A packaging tube 2 is filled with a filling via a filler pipe 1 of a filler machine (not shown). Parallel to the emergence of the filling from the filler pipe 1, a suitable piece of the tube 2 is withdrawn from the outer circumference of the filler pipe 1.

In phase A, the tube 2 filled with filling is enclosed by two pairs 3, 4 of displacement members 31, 32 and 41, 42. Once the tube in phase B has been filled with filling along a defined length, the displacement members 31, 32 and 41, 42 of the pairs 3, 4 move towards one another. The openings enclosed by the pairs 3, 4 decrease in size, and the tube 2 is constricted.

After constriction of the tube 2, the two pairs 3, 4 are moved away from one another in the axial direction, such that, in phase C, a portion 5 free of filling is obtained between the pairs 3, 4. To create the portion 5 free of filling, it may be expedient for only the pair 3 to move relative to the tube 2, while the pair 4 remains in a fixed position in relation to the tube 2. This is made easier if the pair 4 completely constricts the tube 2, while the pair 3 stops the constriction movement shortly before the end. Closure clips 6 can be fitted in the portion 5 free of filling and permanently seal off individual packaging units of the tube 2.

For phase A, a drive element 7 for moving the displacement member 31 is also shown. The other displacement members are equipped with comparable drive elements.

In the representation of the inventive arrangement of displacement members in FIG. 2, the pair 3 is shown in solid lines and the pair 4 in broken lines. The displacement members 31 and 32 of the pair 3 have V-shaped recesses on the faces directed towards one another, and are therefore concavely shaped. With these V-shaped recesses, the displacement members 31, 32 enclose a square opening 33. The two displacement members 31, 32 are contiguous with the opening 33 at two overlap points 34, 35. By means of a linear movement of the displacement members 31, 32 towards one another, the opening 33 decreases in size. During this movement, the overlap points 34 and 35 likewise move towards one another. This scissor-like movement of the overlap points 34 and 35 entails a particular danger of damaging the tube 2 enclosed by the opening 33.

The pair 4 of displacement members 41, 42, indicated by broken lines, is offset at 45° relative to the pair 3. The displacement members 41, 42 enclose an opening 43, with overlap points 44, 45 contiguous to the opening 43.

The intersection of the openings 33 and 43 forms the passage to which the tube 2 is constricted. By means of the pairs 3, 4 being offset at 45°, the overlap points 34, 35, 44, 45 are not contiguous to the passage. The overlap point 34 is held at a distance by the displacement member 42, the overlap point 35 by the displacement member 41, the overlap point 44 by the displacement member 31, and the overlap point 45 by the displacement member 32.

The displacement members of the pairs 3, 4 each move towards one another in synchrony, such that the distance between overlap points and passage is maintained throughout the entire movement. During the constriction procedure, the tube 2 does not come into contact with the overlap points, thereby avoiding or reducing the danger of the tube being damaged.

The invention claimed is:

1. Device for constricting a tube (2) filled with filling, which device comprises several pairs (3, 4) of displacement members (31, 32, 41, 42), in which
   a) the displacement members of each pair (3, 4) overlap one another to enclose an opening (33, 43),
   b) both displacement members (31, 32, 41, 42) adjoin the enclosed opening (33, 43) at two overlap points (34, 35, 44, 45) per pair,
   c) the displacement members (31, 32, 41, 42) are designed for a linear constriction movement that alters the size of the openings (33, 43), and
   d) the openings (33, 43) lying one behind the other in the axial direction of the tube together enclose a passage,
   characterized in that the openings (33, 43) are not congruent with the passage, and in that the overlap points (34, 35, 44, 45) are spaced apart from the passage during the greater part of the constriction movement.

2. Device according to claim 1, characterized in that the overlap points (34, 35, 44, 45) are spaced apart from the passage during the whole of the constriction movement.

3. Device according to claim 1 or claim 2, characterized in that comprises two pairs (3, 4) of displacement members (31, 32, 41, 42).

4. Device according to claim 1 or claim 2, characterized in that the pairs (3, 4) of displacement members (31, 32, 41, 42) succeed one another directly in the axial direction.

5. Device according to claim 1 or claim 2, characterized in that the pairs (3, 4) of displacement members (31, 32, 41, 42) are movable relative to one another in the axial direction.

6. Device according claim 1 or claim 2, characterized in that the displacement members (31, 32, 41, 42) are concavely shaped on their face directed towards the opening.

7. Device according to claim 6, characterized in that the displacement members (31, 32, 41, 42) have a V shape on their face directed towards the opening.

8. Device according to claim 7, characterized in that the limbs of the V enclose an angle of between 80° and 100°.

9. Device according to claim 1 or claim 2, characterized in that the pairs (3, 4) are offset at an angle relative to one another in a plane perpendicular to the axial direction.

10. Device according to claim 9, characterized in that the pairs (3, 4) are offset relative to one another at an angle of between 40° and 50°.

11. Device according to claim 1 or claim 2, characterized in that the displacement members (31, 32, 41, 42) of one pair (3, 4) have a common axis of movement.

12. Device according to claim 1 or claim 2, characterized in that it comprises a drive element (7) for the movement of the displacement members.

13. Device according to claim 1 or claim 2, characterized in that one drive element (7) is provided per displacement member (31, 32, 41, 42).

14. Device according to claim 1 or claim 2, characterized in that one drive element (7) is provided for several displacement members (31, 32, 41, 42).

* * * * *

UNITED STATES PATENT AND TRADEMARK OFFICE
CERTIFICATE OF CORRECTION

PATENT NO.        : 7,666,072 B2
APPLICATION NO.   : 11/913669
DATED             : February 23, 2010
INVENTOR(S)       : Gustav Albrecht Schalk It is certified that error appears in the above-identified patent and that said Letters Patent is hereby corrected as shown below:

Column 4, line 54, add "the device" after the word "that" and before the word "comprises."

Column 4, line 62, add "to" after the word "according."

Signed and Sealed this

Twenty-seventh Day of April, 2010

David J. Kappos
*Director of the United States Patent and Trademark Office*